Aug. 9, 1932.  B. HYANES  1,871,214
COMBINED DUST COLLECTOR AND SHUT-OFF COCK
Filed Aug. 18, 1931
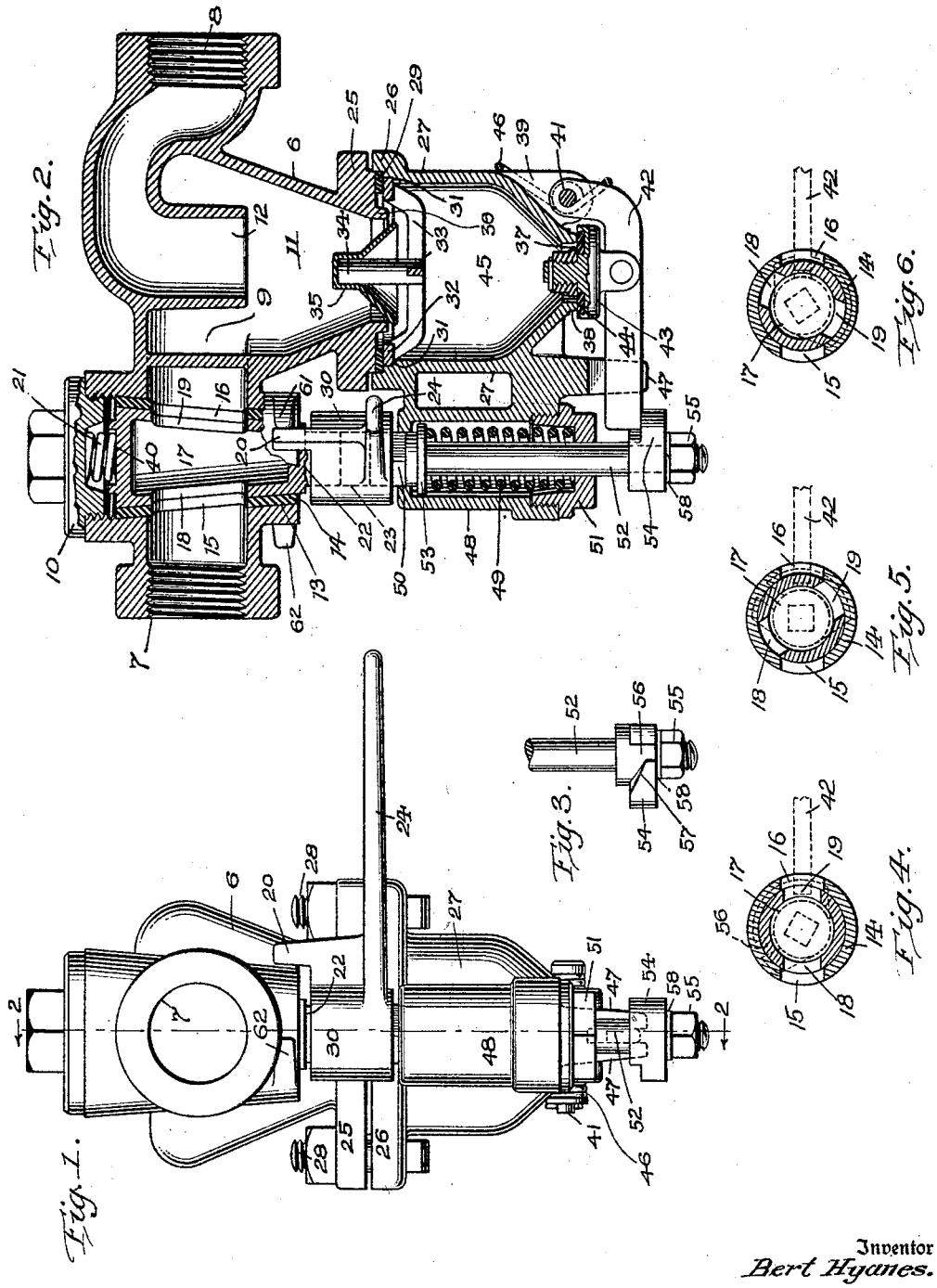
Inventor:
Bert Hyanes.
By
Attorneys Patented Aug. 9, 1932

1,871,214

UNITED STATES PATENT OFFICE

BERT HYANES, OF BALTIMORE, MARYLAND, ASSIGNOR TO THE NEW YORK AIR BRAKE COMPANY, A CORPORATION OF NEW JERSEY

COMBINED DUST COLLECTOR AND SHUT-OFF COCK

Application filed August 18, 1931. Serial No. 557,907.

This invention relates to air brakes, and particularly to means for discharging dust and moisture from the piping system without causing excessive losses of pressure fluid.

In the usual railway car brake equipment there is a brake pipe extending lengthwise of the car, and a branch pipe leading from the brake pipe to the triple valve, or some equivalent mechanism, which controls the charging of the reservoirs, the admission of reservoir air to the brake cylinders, and the release of pressure from the brake cylinders.

Each branch pipe is customarily provided with a device for collecting dust and moisture, and a stop cock is interposed between this and the brake pipe for cutting out the brake equipment of that car in case of necessity. The particular form of the dust collector is not material. In this application, there is illustrated, in somewhat modified form, a commercial type of vortex separator commonly used in the air brake art, to collect dust and moisture from the train pipe air, and generally called a dust collector.

When the collecting device is to be opened for removal of its contents, it is necessary that the branch pipe be closed off from the brake pipe, as otherwise air would be vented from the brake pipe, causing an undesirable brake application extending beyond the car actually being inspected.

This invention provides a dust collector and a stop cock as a single unit, so arranged that a single operation serves to close the stop cock, and release the discharge valve of the collector, and a reverse operation, serves to lock the discharge valve in closed position and open the stop cock. This arrangement not only provides means for rapidly and completely discharging the contents of the collector through a quick-opening valve, but it prevents the discharge valve from being opened before the stop cock is closed. Similarly, it prevents opening of the stop cock before the discharge valve is closed and locked.

The drawing illustrates a preferred form of apparatus embodying this invention. In the drawing,—

Fig. 1 is an elevation of one form of apparatus embodying this invention;

Fig. 2 is a sectional view on the line 2—2 of Fig. 1, certain parts being in elevation to show them more clearly;

Fig. 3 is a detail view of a cam included in the discharging mechanism; and

Figs. 4, 5 and 6, are views, partly sectional and partly diagrammatic, showing the relative positions of the stop cock and the discharge valve locking mechanism, with the discharge valve locking mechanism in fully closed, intermediate, and fully opened positions, respectively. In these views the dotted lines indicate the discharge valve locking mechanism.

The body of the collector is indicated at 6. It is provided with a threaded inlet connection 7 and a threaded outlet connection 8. Air entering through the connection 7 from the brake pipe, flows through a passage 9 and is directed tangentially into the vortex or centrifugal passage 11 in which the separation of the dust and moisture from the air occurs. From this chamber the air passes off through the central exhaust passage 12 to the discharge connection 8, and thence to the triple valve or equivalent device.

The body 6 has a boss adjacent inlet passage 7, and the body including this boss is formed with a tapered bore 13 to receive a correspondingly tapered valve bushing 14. The bushing 14 is provided with two diametrically disposed openings 15 and 16 aligned with the inlet passage of the collector. A tapered valve 17 is rotatably seated within the bushing 14, and has diametrically disposed openings 18 and 19 similar to those in the bushing 14, and adapted, when aligned therewith in one limit of movement, to permit unrestricted passage of air from inlet 7 to the collector, and in its other limit of movement to close off the passage from the connection 7 to the collector.

The bore 13 is open at either end, the upper end being threaded to receive a threaded cap 10. A coiled expansion spring 21 is disposed in a seat 40 formed for it in the upper end of the valve 17, and is confined between this seat and the cap 10.

At its lower end, valve 17 has a squared shank 22 which fits into a correspondingly squared socket 23 in the hub 30 of an operating handle 24 by which the valve may be manipulated. The socket 23 is preferably broached to aid the seating of shank 22 in it. The handle 24 has an upstanding lug 20 which limits the movement of the handle, this lug being confined between shoulders 61 and 62 formed on the stop cock housing, as shown in Fig. 2.

The body 6 is open at the bottom and provided with a bolting flange 25 to which, the flange 26 of the dust collector casting 27 is clamped by bolts 28, a gasket 29 being interposed between the flanges. The casting 27 is counterbored at 31 to form a seat for a spider 32, the radial arms 33 of which support an upstanding stud 34. Upon this stud is vertically slidable and tiltable, a combined deflector and valve 35. This member is of umbrella shape and during a heavy flow of air, caused by lowering the pressure in chamber 11 below that in chamber 45, is forced upward and seats against a bead 36 encircling the open bottom of the casting 6, and prevents any accumulations present in the collecting chamber from being sucked upwardly into the branch pipe.

The body 27 tapers toward its bottom and has at its extreme end a discharge opening 37 encircled by a bead 38 forming a valve seat. Pivotally secured to lugs 39 on body 27 by a pin 41, is an arm 42 underlying the discharge opening 37. A downwardly opening poppet or discharge valve 43, having a sealing gasket 44 is pivotally secured to the arm 42, and in the absence of pressure in the chamber 45 is held against the seat 38 by a double coiled torsion spring 46. The free end of arm 42 is received between and guided between two depending lugs 47 cast integrally with the body 27. Arm 42 extends beyond these lugs so that it may be engaged by a locking cam, to be described.

Opposite the lugs 39, and formed integrally with the casting 27, is a spring barrel 48 which houses a coiled spring 49. The spring 49 is retained within the barrel by a threaded plug 51 screwed into the lower end of the spring barrel.

A spindle 52, having an enlargement 53 at its upper end, is guided at its lower end in the plug 51. The enlargement 53 contacts with the upper end of the coil spring 49 and serves to limit the travel of the spindle by contacting with the upper end of the spring barrel, as the spindle is urged upward by the coil spring. Both the spindle and the spring barrel are concentric with the axis of the stop cock.

Beyond the enlargement 53, the spindle 52 is of somewhat larger diameter, and is journaled for rotation in the upper end of the spring barrel 48. The spindle terminates in a squared head 50 which extends beyond the spring barrel and fits into broached socket 23 of hub 30 of the operating handle 24.

At its lower end the spindle carries a cam 54 secured on a squared portion of the spindle by a clamping nut 55, and lock washer 58. The cam is slotted at 56, one side wall of the slot being beveled to form an inclined cam surface 57. Upon rotation of the cam, the free end of arm 42 will ride upon the inclined surface 57 to either raise or lower it and thus to lock or release the arm 42, depending upon the direction of rotation of the cam.

In operation, when the discharge valve is to be opened, the handle 24 is moved to the left, as viewed in Fig. 2. This rotates the stop cock in a closing direction and at the same time moves the cam 54 similarly in a direction to bring the slot 56 under the arm 42. As shown in Fig. 5, however, the stop cock will be closed before the upward pressure on arm 42 is released sufficiently to allow the discharge valve to open. As the handle 24 is moved further, the lever 42 rides down the incline 57 until aligned with the slot 56, when it is released and the pressure in chamber 11 and the branch pipe unseats valve 43 and blows out the accumulated dirt and moisture. In the extreme limit of movement, lug 20 engages shoulder 62.

Upon pressure being exhausted from the chamber 11, the torsion spring 46 acting on the valve arm 42, returns the valve 43 to its seat, and the arm 42 to a position where it may be engaged by the incline 57 of the cam 54. By reversing the movement of handle 24, i. e., by rotating it to the right in Fig. 2, the arm 42 will ride upon the incline 57, thereby moving the arm 42 upwardly, and firmly seating the valve 43. Further rotation of the handle opens the stop cock and reestablishes air flow through the collector. In the full open position of valve 17, lug 20 engages shoulder 61.

By reference to Figs. 4, 5 and 6, the relative positions of the valve 17 and the collector locking mechanism will be seen. In Fig. 4, the stop cock is open, and arm 42 rests on the high part of cam 54 at a point remote from slot 56. In Fig. 5, the stop cock has just closed and slot 56 is approaching the arm 42 at the top of inclined surface 57. The fully closed position of the stop cock is shown in Fig. 6, the slot 56 being in registry with arm 42 so as to allow the valve 43 to open under pressure from chamber 45.

The invention described, not only simplifies the inspection of brake equipment, but it prevents delays and undesirable brake applications such as may occur when stop cocks and dust collectors are manipulated separately.

While the embodiment illustrated has demonstrated decided utility in practice, it is recognized that modified forms can be devised to accomplish the same result, and no necessary limitation to the particular structure illustrated is implied.

What is claimed is:

1. In an air brake system, the combination with a dust collecting device, of a stop cock and a discharge valve operatively associated with said device; and a single means for causing operation of said cock and said valve in timed sequence.

2. In an air brake system, the combination with a train pipe subject to fluid pressure, of a dust collector; a valve for controlling the supply of pressure fluid to said collector; a discharge valve for said collector; manually operable means for releasing said discharge valve; and a mechanical connection between said controlling valve and said releasing means.

3. In an air brake system, the combination with a pneumatic pressure line, of a dust collector; a stop cock for controlling the connection between said line and collector; a discharge valve in said collector; and manually operable means movable in one direction for sequentially closing the stop cock and releasing the discharge valve, and movable in the other direction for locking the discharge valve and opening the stop cock.

4. In an air brake system, the combination with a train pipe subject to fluid pressure, of a dust collector connected therewith; a stop cock mounted in the inflow passage to the collector; a dust collecting chamber in said collector and having a dust discharge aperture; a hingedly mounted lever underlying said discharge aperture; a valve pivotally mounted on said lever for sealing said discharge aperture; a rotatable cam, adapted to engage or disengage said lever to lock or release said valve; spring means urging the valve in a closing direction; and manually operable means for sequentially closing said stop cock and actuating said cam to release the dust discharge valve, and upon reverse movement to lock the discharge valve and open the stop cock.

5. In an air brake system, the combination with a train pipe subject to fluid pressure, of a dust collector and a stop cock; a dust collecting chamber in said collector having a dust discharge aperture at its bottom; a hingedly mounted lever underlying the dust discharge aperture; a poppet valve carried by said lever; spring means for holding said valve in its closed position when the valve is not subjected to pressure; a rotatable, axially movable spindle; a cam at one end of said spindle, said cam being adapted to be moved into and out of engagement with one end of said valve lever; spring means for biasing said spindle and cam in one direction; and manually operable means having a mechanical connection with said stop cock and said spindle to actuate them in sequence.

6. In an air brake system, the combination with a train pipe subject to fluid pressure, of a dust collector containing a discharge valve; a stop cock for controlling the supply of pressure fluid from said pipe to said collector; a lever pivoted to said collector and carrying the discharge valve; a spindle for actuating said stop cock; and a cam on said spindle for locking and releasing said lever in timed sequence with the movement of the stop cock.

7. In an air brake system, a chamber; means for supplying said chamber with fluid under pressure; a rotatable cock for controlling the supply of fluid to said chamber; a rotary cam; a single means for moving said cock and said cam in concert; and a vent valve controlled by said cam.

8. In an air brake system, a chamber; means for supplying said chamber with fluid under pressure; a rotatable cock for controlling the supply of fluid to said chamber; a rotary cam mounted coaxially with said cock; a discharge valve for said chamber; means for moving said cock and cam in concert; and means actuated by said cam for controlling the operation of said valve.

In testimony whereof, I have signed my name to this specification.

BERT HYANES.